United States Patent [19]

Yakkel

[11] 4,274,208
[45] Jun. 23, 1981

[54] PRECISION BENDING LEVEL

[76] Inventor: James E. Yakkel, 18576 SE. 246 Pl., Kent, Wash. 98031

[21] Appl. No.: 71,138

[22] Filed: Aug. 31, 1979

[51] Int. Cl.³ .............................................. G01C 9/28
[52] U.S. Cl. ...................................................... 33/371
[58] Field of Search ................................. 33/370–373, 33/343, 451

[56] References Cited

U.S. PATENT DOCUMENTS

| 1,398,183 | 11/1921 | Fagrie | 33/451 |
|---|---|---|---|
| 2,419,941 | 5/1947 | Belzung | 33/371 |
| 2,541,366 | 2/1951 | Hellwig | 33/373 |
| 2,842,863 | 7/1958 | Kennedy | 33/371 |

Primary Examiner—Charles E. Phillips
Attorney, Agent, or Firm—Kyle W. Rost

[57] ABSTRACT

A bending level tool has a body with longitudinal axis defining a handle at the rear and thereof and axially aligned first level vial at the forward end, with a perpendicularly aligned second level vial attached to the body at an intermediate shank. A pair of spaced tines forming an attachment fork extend normally to the plane established by the axes of the two vials, with one fork flush with the forward end of the first vial and the second tine attached to the shank at the forward face of the second vial, and a screw attached to one of the tines for clamping a pipe wall against the opposite tine. The length and width of various functional parts of the bending level are of predetermined small increment dimensions, preferably multiples of one-fourth inch, permitting ready measurement of pipe diameters and the like, and the angular relations between parts of the level permit square measurement.

9 Claims, 10 Drawing Figures 4,274,208

1

PRECISION BENDING LEVEL

BACKGROUND OF THE INVENTION

1. Field of the Invention

The invention relates to geometrical instruments, particularly of the straight edge type with a levelling feature of the square type. Specifically, the invention relates to a tool for conduit bending and metal bending, that is also a pocket level and small increment measuring tool.

2. Description of the Prior Art

Tools for leveling and squaring are known in a variety of configurations particularly in the carpentry trades. U.S. Pat. No. 613,946 to Starrett discloses a three way level and square that is adaptable to forming plumb right angles by means of two perpendicular arms, each having a level on one mutually coplanar face and one of the arms having a level on a second face on the surface opposite from the right angle. Variations and improvements on the above device are reflected in U.S. Pat. No. 1,963,805 to Radke and U.S. Pat. No. 3,524,259 to Handley, both of which relate to level devices applied to squares. The Radke device consists of a square with mutually facing levels on the two arms thereof and a fastening slot in one of the arms on the surface opposite from the level vial. This device is clamped over one leg of a larger square and is provided with means for angularly altering the relationship between the two squares. The Handley device provides three coplanar level vials, one aligned with each leg of a square and one at 45 degrees to each leg, located at their intersection.

Special squares and levels for plumbers and pipe fitters have taken into account the need to fit the square against round pipes, as shown in U.S. Pat. No. 3,826,013 to Baher, while other devices have combined squaring and measuring functions, as reflected in U.S. Pat. No. 2,816,269 to Becker and U.S. Pat. No. 1,400,626 to Rodriguez. The latter two devices provide means for linear measurement as well and angular measurement to aid in properly aligning pipes. While most levels provide an indication of only certain preselected angles, it is also known to provide measurement of a range of angles and to attach the level to a workpiece by a clamp, as taught in U.S. Pat. No. 3,071,863 to MacMillan for a wheel alignment gage.

While each of the known levels and squares is adapted to a specific job, none has proven satisfactory for use in determining the accuracy of pipe and conduit bends on the many types of pipe benders in common use, especially at work sites. Such benders may be electrical or manual, and often have tight working clearances between the pipe and portions of the bender, such as the bending shoes. Because many types of benders may be encountered, including the "hickey" benders operated by either hand or foot, pipe benders have become self-reliant to judge the accuracy of bends, but in those pipes having more than a single bend it is very difficult for the eye to accurately align the pipe for the second bend, which must be properly aligned with the first so that the pipe will continue to lie in a single plane. It is therefore desirable that a single, portable, widely applicable tool be created that can be accurately and easily applied to aid in bending pipe by any of the known apparatus employed for that purpose.

2

SUMMARY OF THE INVENTION

A precision bending level for pipe, conduit, or like objects in which it is desired to form bends while maintaining the object in a plane includes a longitudinal body with a handle at one end and an axially aligned level vial of the type indicating level at any position of rotation on its axis at the opposite longitudinal end of the body. Extending perpendicularly to the body axis is another vial of the type described, the axes of the two vials defining a plane. Attaching clamp means extends normally to the defined plane to enable the bending level to be attached to the open end of the pipe or like object. The clamp means may be a fork with a pair of spaced tines having an adjustable member such as a thumb screw for clamping an object between one of the tines and the adjustable member.

The bending level is adaptable to numerous associated tasks such as measuring small increments and determining both inside and outside square corners by virtue of its specific configuration.

The primary object of the invention is to create a bending level adapted to operation with a wide variety of bending machines, including those known in the industry to have extremely close working clearances.

Another object is to create a bending level that in addition to its primary function, offers the ability to measure small increments and both inside and outside corners, so that the tool can replace the need for a plurality of other single purpose tools that may have been required by pipe and conduit benders in the past.

A further object is to create a tool for the above stated purposes that is small in size and may be conveniently carried in a pocket.

DESCRIPTION OF THE PREFERRED EMBODIMENT

Figure 1:
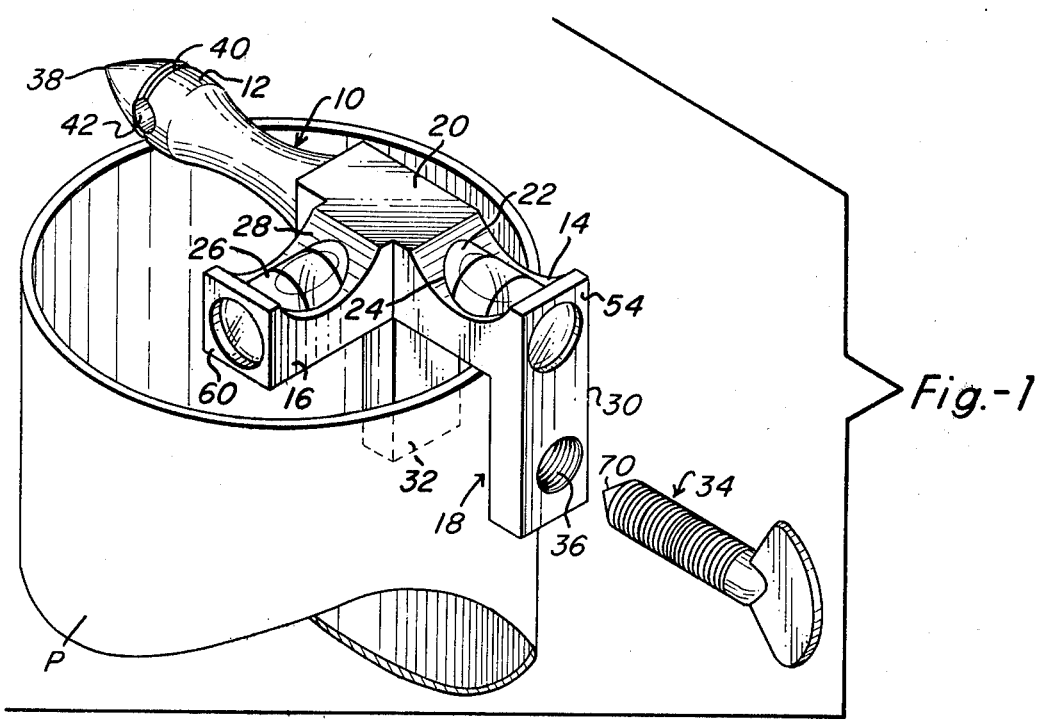
FIG. 1 is an isometric view of the bending level applied to the end of a pipe.

The precision bending level 10 is best shown in FIG. 1 as applied to a pipe P in the manner best suited for monitoring the relative position of the pipe during the bending process. The bending level includes a handle 12, a first arm 14, a second arm 16, and attaching means such as fork clamp 18, suitable for fastening the level 10 to the end of the pipe P, or alternatively to the wall of the pipe at a selected point. A shank 20 is located intermediate the handle and the first arm 14, and also serves as the connection point for the second arm 16. Optionally, the clamp 18 may be at least partially joined to the shank.

The precision bending level is adaptable to multiple functions integrated into its structure. In this regard, the geometric relationships between the various structural elements are important to the accomplishment of the primary function of aiding pipe bending. In addition, the absolute length of various composition parts is critical to the use of the bending level as a pocket measure. As a matter of practical necessity, the overall size of the bending level is highly relevant to its ability to accommodate the great variety of pipe bending machines that the user may encounter. For these reasons, the structure is here described in both geometric and dimensional relationship.

The handle 12 is elongated to follow a longitudinal axis extending also through shank 20 and first arm 14. Together, the handle, shank and first arm form a coaxial body for the bending level. In the first arm, which may be termed a level vial barrel, a level indicating device such as level vial 22 is carried in suitable position to indicate when the longitudinal axis is parallel with the horizontal. Among known types of level vials are those that indicate a horizontal position from any rotational position about the axis of the vial. This type is preferred, in which instance the first arm may be referred to as having a top surface with level vial opening 24 formed therein, through which the vial provides the indication that its axis, and hence the longitudinal axis of the body, is parallel to the horizontal.

The second arm 16, which constitutes another level vial barrel, contains a level indicating device such as vial 26 similar to vial 22, and also has a top surface with a level vial opening 28 formed therein. Arm 16 is elongated along a transverse axis perpendicular to the longitudinal axis, and vial 26 is axially aligned with the transverse axis. The top surfaces and vial notches of the two arms face in the same direction and indicate when both axes are in the horizontal plane. Thus, the bending level 10 includes means for indicating when a plane through the tool is horizontal by indications along at least two coplanar axes.

The fork clamp 18 provides means for attaching the bending level 10 to a workpiece, at a portion thereof having a wall surface perpendicular to one of the two axes defining the horizontal plane. The wall may constitute a planar piece of sheet material, or it may be a single line on the surface of a cylindrical pipe through which a tangent plane would be perpendicular to one of the axes. The clamp includes a front tine 30 and a spaced rear tine 32, with a cooperating member for adjustably sizing the gap between the tines. Thumb screw 34 may be engaged in a threaded aperture 36 in one of the tines to provide the necessary adjustable clamping force to attach the bending level to the workpiece. In the drawings, the front tine 30 depends perpendicularly from the plane of the two arms at the free end of the first arm and longitudinal axis, and the second tine 32 depends perpendicularly from the plane of the arms at an intermediate point along the longitudinal axis, below the shank. Optionally the front tine is magnetized at least at the front wall thereof.

When the tool 10 is viewed in its overall configuration, as shown in FIGS. 1–4 inclusive, the various geometric relationships become evident. At the rear or handle end of the tool, the handle 12 has a pointed rear tip 38 that expands forwardly into a bullet or parabolic shaped tip 38 having an annular groove 40 in a plane normal to the longitudinal axis of the body. A diametric hole 42 crosses the tip 39 through the groove and extends along an axis parallel to the axis of the second arm 16. Next forwardly in the handle structure is a tapered waist section 44 circular in cross-section that provides a finger hold. Shank 20 is connected to the waist 44 but is square in tranverse cross-section, connecting along smooth top surface plane 46 and bottom surface plane 48 with the first and second arms 14 and 16. The shank has a right hand side surface plane 50 that it shares with the side of the first arm, and a left hand side surface plane 52 that it shares with the opposite side of the first arm. At the forward end of the longitudinal body is a planar end surface 54. The second arm 16 has a planar forward side surface 56 and rear side surface 58, both of which are perpendicular to the longitudinal axis of the tool and to the surface 50. The free end of arm 16 is planar surface 60, perpendicular to surfaces 46, 48, 56 and 58. The front fork tine 30 has a front surface sharing the plane 54, a rear surface parallel thereto and having a smooth surface 62, and opposite side surfaces sharing planes 50 and 52, respectively. The rear tine also shares surfaces 50 and 52 on its sides, has a forward surface 64 in the same plane as surface 56, and has rear surface 66 parallel to 64. The free end of each tine has a planar surface 68 parallel to surface 48.

The dimensions of the preferred embodiment are best expressed in connection with a description of one possible fabrication of the bending level. The starting piece may be a metal rod 4½ inches long and ½ inch square. The rod is end drilled along its longitudinal axis at a first end to form a hole ⅜ inch in diameter and 2 inches deep. Two arcuate level vial openings are milled into the wall of the hole from one flat side of the rod, each opening being ¾ inch long axially, a ¼ inch spacing of unmilled wall separating the two openings, and a ⅛ inch spacing of unmilled wall axially separating the extreme ends of the openings from the respective extreme ends of the hole. At the opposite, second end of the rod, the rod is machined over a length of 1¾ inches to form a handle contoured with a pointed end and an arcuately tapered waist. The pointed end flares smoothly toward the waist, and a measuring notch 1/16 inch deep and 1/16 inch wide is cut in the flared portion ½ inch from the handle point, after which a diametric hole ⅛ inch in diameter is drilled through the notch. At the first end, a one inch length of the rod is severed, which would divide the two level vial openings at the midpoint between them. The major portion of the rod then constitutes a horizontal level vial barrel through the one inch long drilled portion remaining at the first end thereof, a handle at the 1¾ inch machined portion at the second end thereof, and a shank through the ¾ inch portion between the handle and horizontal level vial barrel. The minor portion of the rod that has been severed constitutes a vertical level vial barrel, which is then welded to the shank, spaced one inch from the first end of the rod with the level vial openings coplanar and facing in the same direction. The attachment fork is constructed from two metal rods, each one inch long, ½ inch wide, and ¼ inch thick. The end of the front tine is welded to the opposite side 48 of the horizontal level vial barrel from the level vial opening, with the ½ inch wide forward face of the tine coplanar with the free end 54 of the horizontal level vial barrel. The rear tine is welded to the shank on the opposite surface 48 from the level vial openings and spaced rearwardly one inch from the second end of the rod, resulting in the forward face 64 of the rear tine being coplanar with the forward face 56 of the vertical level vial barrel. The gap between the two tines is ⅜ inch. A ¼ inch hole 36 with 20 gauge threads is formed in the front tine ⅜ inch from the free end, and a ¼ inch by 20 gauge thumb screw 34 with a pointed end 70 and one inch of thread is inserted in the hole. A one inch by ⅜ inch lined level vial is inserted in each barrel by press fit or glue.

From the proposed construction, it is evident that small increment measurements may be taken by directly comparing the dimension of certain parts of the bending level 10 with the object to be measured. For example, ¼ inch is the thickness of either fork tine 30 or 32; ⅜ inch is the width of either fork tine, the thickness of either level vial barrel (arms 14 or 16), or the distance from the measuring notch 40 to the point 38 of the handle; ⅜ inch is the space between the inside edges 62, 64 of the fork tines or the length of the level vial openings 24 and 28; 1 inch is the length of either attachment fork tine from its free end 68 to its attachment to the shank or horizontal level vial barrel at surface 48, or the length of either level vial barrel from its free end 68 to the junction of the barrels; 1¼ inch is the distance between the outside edges 54, 66 of the pair of attachment fork tines, or the distance from the rear edge 66 of the vertical level vial barrel to the rear (inside) edge 62 of the front tine 30; 1⅜ inches is the length of either level vial barrel plus the thickness of the other level vial barrel as measured through the shank, the distance from the top 46 of either level vial barrel to the bottom 68 of the tines, or the distance from the measuring notch 40 to the rear edge 58 of the vertical level vial barrel; 1¾ inches is the distance from the measuring notch to the outside (rear) edge 66 of the rear fork tines; 2 inches is the distance from the point of the handle to the rear edge of the vertical level vial barrel, or the distance from the center of the measuring notch to the inside edge 64 of the rear fork tine; 2¼ inches is the distance from the point of the handle to the rear edge 66 of the rear fork tine; 2½ inches is the distance from the point of the handle to the front edge 56 of the vertical level vial barrel, or the distance from the point of the handle to the forward edge 64 of the rear fork tine; 2¾ inches is the distance from the center of the measuring notch to the rear edge 62 of the front fork tine; 3 inches is the distance from the center of the measuring notch to the forward edge 54 of the front fork tine; 3¼ inches is the distance from the point of the handle to the rear edge 62 of the front fork tine; and 3½ inches is the distance from the point of the handle to the forward surface 54 of the front fork tine, which is the total length of the tool.

Figure 2:
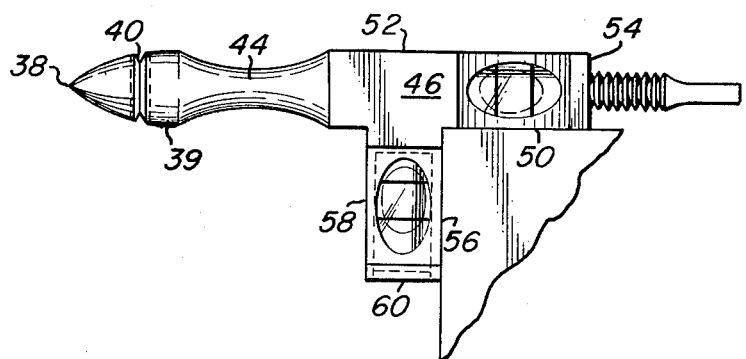
FIG. 2 is a top view of the bending level, showing the operation thereof in measuring an outside corner.
Figure 3:
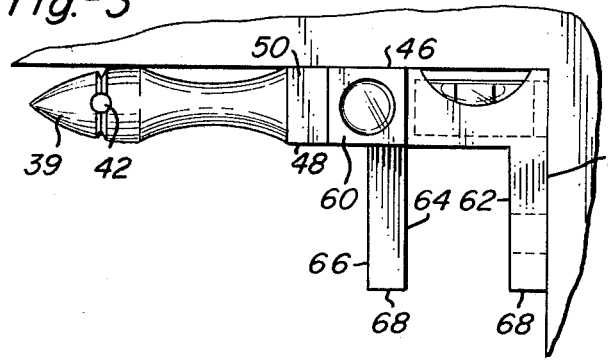
FIG. 3 is a side view of the bending level, showing the operation thereof in measuring an inside corner.
Figure 4:
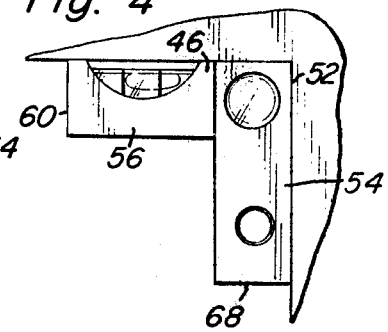
FIG. 4 is a front view of the bending level, showing an alternative operation thereof in measuring an inside corner.

In addition to its measuring function, the bending level is a square capable of measuring inside and outside corners. In FIG. 2 the tool is shown in operation while measuring the squareness of an outside corner between the front surface 56 of arm 16 and the side surface 50 of arm 14. FIG. 3 shows the operation of the tool in measuring an inside corner against the top surface 54 of the forward tine 30, while FIG. 4 shows this type of measurement taken with the top surface 46 of the vertical level vial barrel and the side surface 52 of the front tine 30.

The operation of the tool for pipe or conduit bending is illustrated in FIGS. 5-10, wherein an electric pipe bending machine 75 of the type having extremely close working clearances is shown to have a backing plate 78 that supports a roller 80 and cooperating pipe gripping finger 82 as well as a pipe support 84. This machine constitutes no part of the present invention but is shown purely for purpose of example. It performs its bending task on a straight length of pipe with its forward end held between the roller 80 and finger 82 and the rearward portion of the pipe supported on the top side of the support 84. The finger and roller rotate together for a selected arc, such as 90 degrees, to impart a smooth bend of the specified arc into the pipe.

Figure 5:
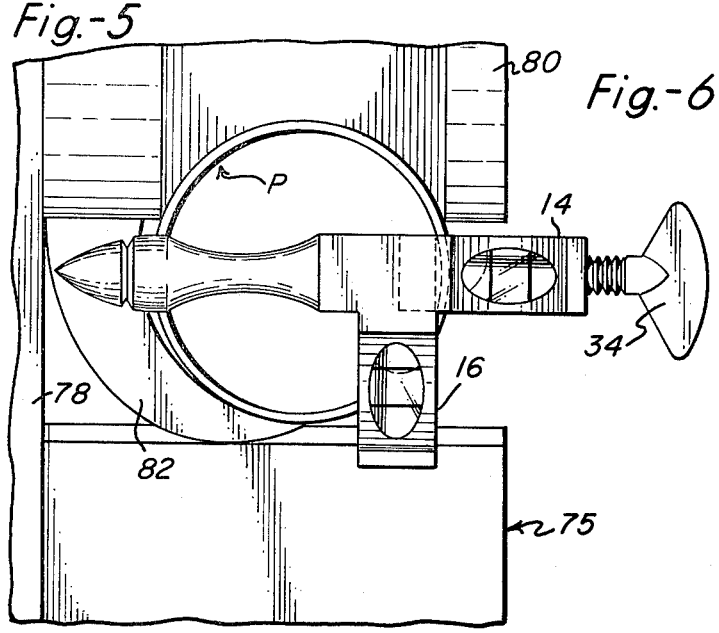
FIG. 5 is an enlarged end view of a pipe with the bending level attached in a bending machine.
Figure 6:
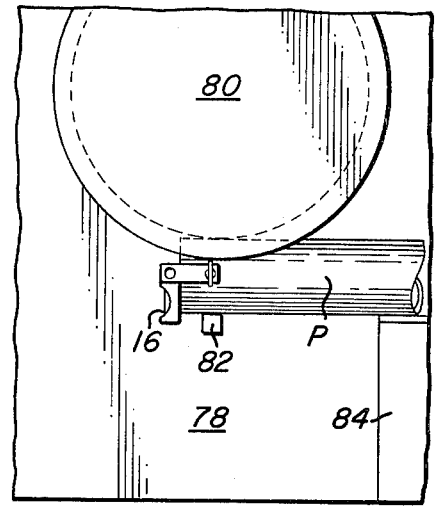
FIG. 6 is a side view of the embodiment of FIG. 5.
Figure 7:
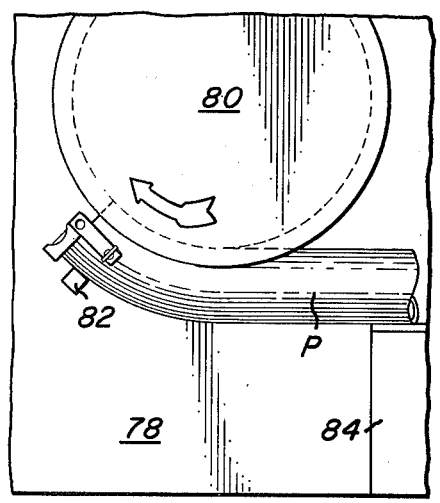
FIG. 7 is a view similar to FIG. 6 in the process of bending an initial bend in the pipe.

FIGS. 5 and 6 illustrate a straight length of pipe P clamped in the bending machine and the bending level 10 attached to the front end of the pipe by tightening the thumb screw 34 against the pipe wall inserted between fork tines 30 and 32, with the rear tine inside the pipe mouth and the front tine outside thereof. The pipe P may be assumed to be horizontal, and the bending level is placed on the pipe with the handle and first arm 14 in horizontal alignment, with the second arm 16 depending vertically therefrom. This position may be referred to as left horizontal position, and the level vial 22 continues to indicate the true horizontal throughout the bending process to assure that the bend is formed within a single plane.

Figure 8:
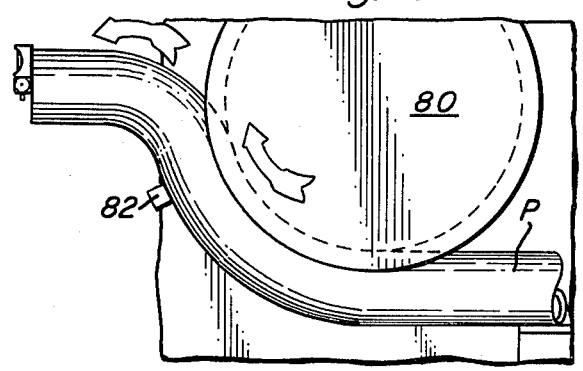
FIG. 8 is a view similar to FIG. 7, showing the formation of an offset bend in the pipe.

With the completion of the first bend, the pipe may be repositioned in the machine in anticipation of making an offset bend. Repositioning requires only that the horizontal section of the pipe be rotated by 180 degrees on its axis and moved forward in the machine, so that the previously upwardly pointing free end is then pointing downwardly, and level vials 22 and 26 again indicate a true horizontal position. Because the handle and arm 14 are still horizontal but the handle now points to the right when viewed from the perspective of FIG. 5, the tool may be said to be in right horizontal position. With reference now to FIG. 8, the bending machine again forms an upward bend in the pipe immediately rearwardly of the first bend, throughout which the vial 22 continues to indicate true horizontal. When the desired bend is complete, the pipe is in the shape of an offset bend with all portions of the bend lying in a single plane, regardless of the exact angles selected for the two bends forming the offset.

Figure 9:
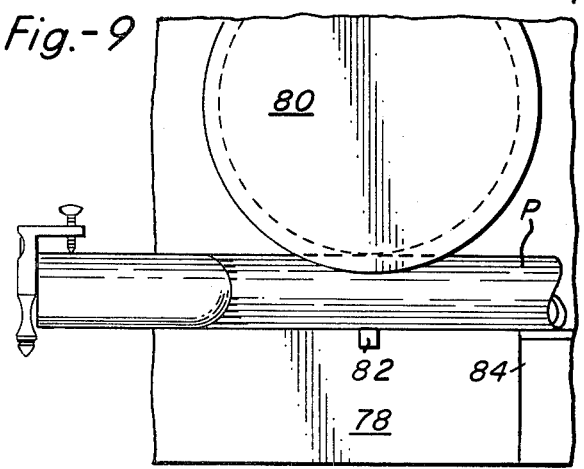
FIG. 9 is a view similar to FIG. 8, showing the pipe and bending level in position preparatory to forming a ninety degree bend.
Figure 10:
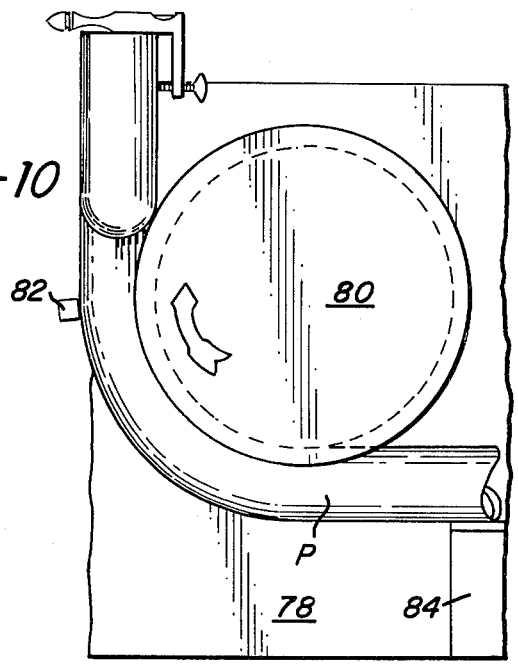
FIG. 10 is a view similar to FIG. 9, showing the completion of the ninety degree bend.

With reference now to FIG. 9, the pipe as already described may be bent at 90 degrees to the plane of the offset bends. This is accomplished by rotating the horizontal section of pipe on its axis by 90 degrees, bringing the plane of the offset bends into horizontal position, with the handle of the bending level pointing downwardly in what may be referred to as down-vertical position. The true horizontal position is indicated by level vial 26. The bending machine then forms the desired 90 degree bend, bringing the bending level to the position of FIG. 10 wherein both level vials 22 and 26 indicate a horizontal position.

Throughout the bending sequence of FIGS. 5-10, the bending level was never repositioned with respect to the pipe end, and the accurate bending of the pipe in the desired plane was at all times by one or both of the level vials. The bending level is capable of monitoring the accurate formation of bends in a true plane from a variety of starting positions, including right or left horizontal position and up or down vertical position, all without the need to reposition the tool during formation of the bends.

While the above description includes many details of preferred structure, it should be understood that the

I claim:

1. A precision bending level, comprising
   (a) an elongated body aligned along a longitudinal axis having a rear and front end, the body having at the rear end a handle with an end knob and a tapered waist forward of the knob; and forward of the handle having a shank and first level vial barrel respectively axially aligned, having mutually coplanar top, bottom, and opposite side surfaces, the level vial barrel having a level vial therein axially aligned with said shank and having an end wall at the front end of the axis and perpendicular thereto, and having a level vial viewing port in the top surface of the level vial barrel;
   (b) a second level vial barrel connected to said body along a transverse axis perpendicular to the axis thereof and having top and bottom surfaces coplanar with the top and bottom surfaces of said shank and first level vial barrel, and forward and rearward side surfaces perpendicular to and joined to one of said opposite side surfaces of the shank and first level vial barrel, the second level vial barrel having a level vial axially aligned with the transverse axis, a level vial viewing portion in said top surface, and an end wall perpendicular to the transverse axis; and
   (c) an attaching fork depending from the bottom side of the body.

2. The precision bending level of claim 1, wherein said attaching fork comprises front and rear tines, the front tine having a forward wall coplanar with said end wall of the first level vial barrel, a pair of opposite side walls coplanar with said side surfaces of the first level vial barrel, a rearward wall parallel to the forward wall, and a lower end wall parallel to said bottom surface of the body; the rear tine having a forward wall coplanar with said forward side surface of the second level vial barrel, a rearward wall parallel to the forward wall, a pair of opposite side walls coplanar with said side surfaces of the first level vial barrel and a lower end wall parallel to said bottom surface of the body; and fastening means for retaining an external object between the front and rear tines.

3. The precision bending level of claim 2, wherein said fastening means comprises a pointed thumb screw, and a threaded hole through said front tine in axial alignment with said body for receiving the thumb screw.

4. The precision bending level of claim 2, wherein said front tine is magnetized at least at said forward wall thereof.

5. The precision bending level of claim 2, wherein said top and bottom body surfaces are parallel and said opposite side body surfaces are parallel, both pairs of surfaces being spaced by an equal predetermined distance, said predetermined distance being one-half the axial length of the first level vial barrel, one-third the axial length of the shank, one-seventh the axial length of the handle, and twice the thickness of the front tine between its forward and rearward walls.

6. The precision bending level of claim 5, wherein said second level vial barrel is connected to the body with its forward side surface at the division between the shank and first level vial barrel, the distance between the forward side surface and rearward side surface is equal to said predetermined distance, and the distance between the forward and rearward wall of the rear tine is one-half said predetermined distance.

7. The precision bending level of claim 5, wherein the length of each of said tines from their respective lower end walls to the bottom surface of the body is twice said predetermined distance.

8. The precision bending level of claim 5, wherein said end knob further comprises a transverse measuring groove formed therein axially spaced from the rear of said longitudinal axis by said predetermined distance.

9. The precision bending level of claim 5, wherein said predetermined distance is one-half inch.